US008001367B2

(12) United States Patent
Repasi et al.

(10) Patent No.: US 8,001,367 B2
(45) Date of Patent: Aug. 16, 2011

(54) PERFORMING APPLICATION SETTING ACTIVITY USING A REMOVABLE STORAGE DEVICE

(75) Inventors: Rolf Repasi, Sunrise Beach (AU); Simon Clausen, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 980 days.

(21) Appl. No.: 11/869,208

(22) Filed: Oct. 9, 2007

(65) Prior Publication Data

US 2008/0084799 A1 Apr. 10, 2008

Related U.S. Application Data

(60) Provisional application No. 60/850,771, filed on Oct. 10, 2006.

(51) Int. Cl.
*G06F 9/312* (2006.01)
*G06F 13/14* (2006.01)
*G11B 20/10* (2006.01)

(52) U.S. Cl. .......... 713/1; 713/100; 711/115; 369/47.12
(58) Field of Classification Search .............. 713/1, 100; 711/115; 369/47.12
See application file for complete search history.

(56) References Cited

U.S. PATENT DOCUMENTS

| | | | |
|---|---|---|---|
| 6,182,212 B1 * | 1/2001 | Atkins et al. ...................... 713/1 |
| 7,024,548 B1 * | 4/2006 | O'Toole, Jr. ...................... 713/1 |
| 7,293,170 B2 * | 11/2007 | Bowler et al. .................. 713/100 |
| 2004/0193953 A1 * | 9/2004 | Callahan et al. ................. 714/15 |
| 2006/0026414 A1 * | 2/2006 | Firebaugh et al. ................. 713/1 |
| 2007/0027936 A1 * | 2/2007 | Stakutis et al. ............... 707/204 |
| 2007/0113069 A1 * | 5/2007 | Gentil et al. .................. 713/100 |

* cited by examiner

*Primary Examiner* — Thomas Lee
*Assistant Examiner* — Fahmida Rahman
(74) *Attorney, Agent, or Firm* — Holland & Hart LLP

(57) ABSTRACT

A method of configuring a processing system to perform application setting activity using a removable storage device in data communication with the processing system includes a) selecting an application, where setting activity associated with the selected application is to be performed using the removable storage device, b) installing, in the processing system, an interception module to intercept application setting activity associated with the selected application; and c) in response to the interception module intercepting application setting activity associated with the selected application, performing the application setting activity using the removable storage device, thereby storing application setting data associated with the selected application in the removable storage device.

18 Claims, 9 Drawing Sheets

PERFORMING APPLICATION SETTING ACTIVITY USING A REMOVABLE STORAGE DEVICE

This application claims the benefit of priority from U.S. Provisional Patent Application No. 60/850,771 filed Oct. 10, 2006, and is incorporated by referenced.

TECHNICAL FIELD

The present invention generally relates to a method, system, computer readable medium of instructions and/or computer program product for performing application setting activity associated with an application using a removable storage device.

COPYRIGHT

A portion of the disclosure of this patent document contains material that is subject to copyright protection. The copyright owner has no objection to the facsimile reproduction by anyone of the patent disclosure, as it appears in a Patent Office patent files or records, but otherwise reserves all copyrights whatsoever.

BACKGROUND ART

Software applications are generally configured to store application settings in non-removable memory of a processing system. For example, it is common for software to be configured to store settings in either the system registry of the processing system, or data files which are stored in the hard drive of the processing system.

However, in the event that the processing system crashes, application setting data is irretrievable, causing the user to reset the application settings which can be a time consuming task.

A user may manually attempt to copy application setting data in a removable storage device in order to make a back up copy of the settings data. However, the user generally requires an extremely detailed knowledge of internal functionality of the software to copy the appropriate application settings successfully.

Some solutions have proposed copying all settings associated with the user environment in a processing system. However, when all the settings are restored, one or more applications can malfunction. For example, system variables copied from one processing system can likely lead to malfunctioning software due to applications being installed in different locations in processing systems.

Therefore, there exists a need for a method, system, computer readable medium of instructions, and/or a computer program product which copies application setting data for a selected one or more applications without the user requiring a detailed knowledge of the internal functionality of the selected one or more applications.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In one broad form, there is provided a method of configuring a processing system to perform application setting activity using a removable storage device in data communication with the processing system, wherein the method comprises:

selecting an application, wherein setting activity associated with the selected application is to be performed using the removable storage device;

installing, in the processing system, an interception module to intercept application setting activity associated with the selected application; and in response to the interception module intercepting application setting activity associated with the selected application, performing the application setting activity using the removable storage device, thereby storing application setting data associated with the selected application in the removable storage device.

In one form, the method comprises performing the application setting activity using the removable storage device and a non-removable storage device of the processing system.

In another form, when the application setting activity is intercepted, the method comprises the removable storage device copying application setting data stored to the non-removable data storage device for the selected application.

In one embodiment, the method comprises launching a selection module to select the application, wherein the selection module is launched from one of:

the processing system; and
the removable storage device.

In another embodiment, the method comprises:

selecting a plurality of applications;

installing, in the processing system, a plurality of interception modules to intercept application setting activity associated with the plurality of applications selected; and in response to each interception module intercepting respective application setting activity associated with the respective application, performing the respective application setting activity using the removable storage device, thereby storing respective application setting data associated with the respective selected application in the removable storage device.

In an optional form, the interception module comprises one or more hook functions, wherein the method comprises, intercepting, using the one or more hook functions of the interception module, the application setting activity associated with the application.

In another optional form, the method comprises installing the interception module followed by launching and installing the application in the processing system.

Optionally, the removable storage device comprises a database, wherein the method comprises, in response to intercepting application setting activity, using the database to emulate a system registry.

Also optionally, the method comprises storing interception data in the removable storage device, wherein the interception data is indicative of:

a type of application setting data which was intercepted;
an original location of the application setting data; and
a new location in the removable storage device of the application setting data.

In one form, in response to intercepting application setting activity, the method comprises querying the interception data to determine if application setting data associated with the application setting activity is stored on the removable storage device, wherein in response to a positive query, the application setting data is used to perform the application setting activity.

In another form, the method comprises:

uncoupling the removable setting data from the processing system;

coupling the removable setting data with a second processing system, wherein the second processing system comprises the selected application, wherein use of the selected application results in application setting activity being intercepted such that application setting data stored on the removable storage device is used.

In another optional form, the method comprises:

installing, in at least one of the removable storage device and the processing system, one or more rules; and upon intercepting application setting activity, applying at least some of the one or more rules to determine if the application setting activity is to be performed using one of the processing system; and the removable storage device.

In another broad form there is provided a system to configure a processing system to perform application setting activity using a removable storage device in data communication with the processing system, wherein the system is configured to:

select an application, wherein setting activity associated with the selected application is to be performed using the removable storage device;

install, in the processing system, an interception module to intercept application setting activity associated with the selected application; and in response to the interception module intercepting application setting activity associated with the selected application, perform the application setting activity using the removable storage device, thereby storing application setting data associated with the selected application in the removable storage device.

In one form, the system is configured to perform the application setting activity using the removable storage device and a non-removable storage device of the processing system.

In another form, the system is configured to launch a selection module to select the application, wherein the selection module is launched from one of:

the processing system; and the removable storage device.

In one embodiment, the system is configured to:

select a plurality of applications;

install, in the processing system, a plurality of interception modules to intercept application setting activity associated with the plurality of applications selected; and in response to each interception module intercepting respective application setting activity associated with the respective application, perform the respective application setting activity using the removable storage device, thereby storing respective application setting data associated with the respective selected application in the removable storage device.

In another embodiment, the interception module comprises one or more hook functions configured to intercept the application setting activity associated with the application.

In an optional form, the removable storage device comprises a database configured to emulate a system registry.

In another optional form, the system is configured to store interception data in the removable storage device, wherein the interception data is indicative of:

a type of application setting data which was intercepted;

an original location of the application setting data; and a new location in the removable storage device of the application setting data.

In one aspect, in response to intercepting application setting activity, the system is configured to query the interception data to determine if application setting data associated with the application setting activity is stored on the removable storage device, wherein in response to a positive query, the application setting data is used to perform the application setting activity.

In another broad form there is provided a computer program product for performing application setting activity using a removable storage device in data communication with a processing system, wherein the computer program product comprises a computer readable medium having a computer program recorded therein or thereon, wherein the computer program product configures the processing system to:

select an application, wherein setting activity associated with the selected application is to be performed using the removable storage device;

install, in the processing system, an interception module to intercept application setting activity associated with the selected application; and in response to the interception module intercepting application setting activity associated with the selected application, perform the application setting activity using the removable storage device, thereby storing application setting data associated with the selected application in the removable storage device.

According to another broad form, the present invention provides a computer readable medium of instructions for giving effect to any of the aforementioned methods or systems.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
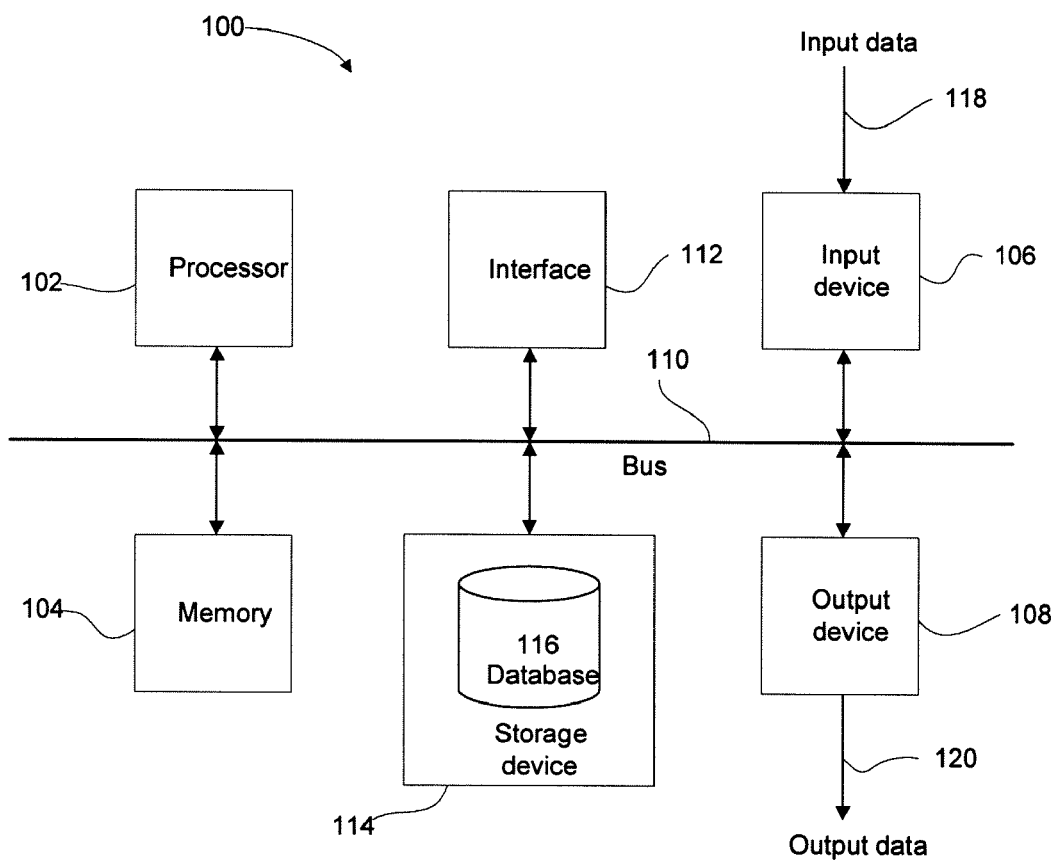
FIG. 1 is a block diagram illustrating an example of a processing system.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1.

In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 can be adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server processing system, specialised hardware, or the like.

A hook (also known as a hook procedure or hook function), as used herein, generally refers to a callback function provided by a software application that receives certain data before the normal or intended recipient of the data. A hook function can thus examine or modify certain data before passing on the data. Therefore, a hook function allows a software application to examine data before the data is passed to the intended recipient.

An API ("Application Programming Interface") hook (also known as an API interception), as used herein as a type of hook, refers to a callback function provided by an application that replaces functionality provided by an operating system's API. An API generally refers to an interface that is defined in terms of a set of functions and procedures, and enables a program to gain access to facilities within an application. An API hook can be inserted between an API call and an API procedure to examine or modify function parameters before passing parameters on to an actual or intended function. An API hook may also choose not to pass on certain types of requests to an actual or intended function.

A hook chain as used herein, is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, others can modify messages or stop their progress through the chain, restricting them from reaching the next hook procedure or a destination window.

Figure 2:
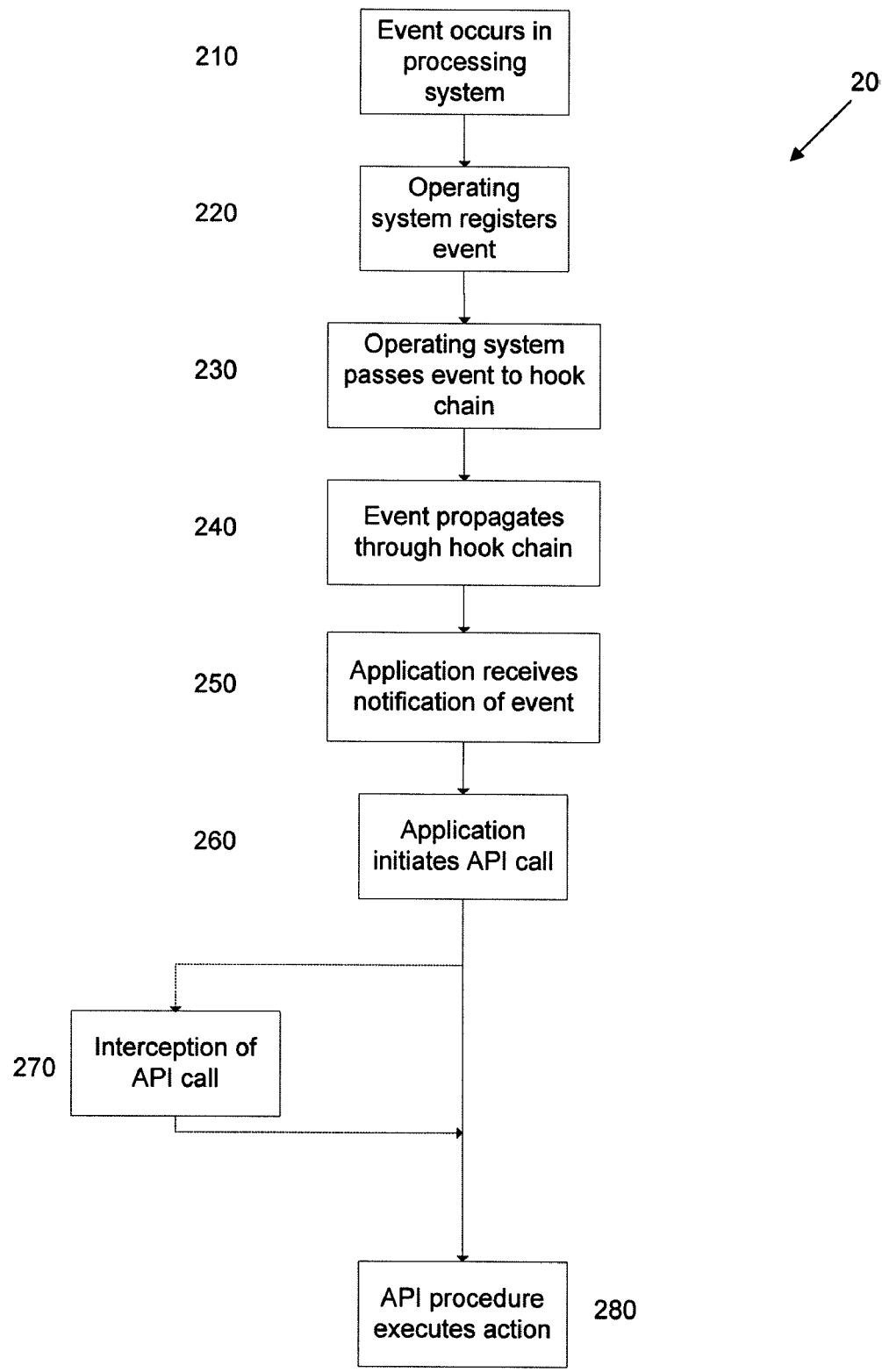
FIG. 2 is a flow diagram illustrating an example of interception.

Referring to FIG. 2 there is shown an example of a method 200 of intercepting activity in a processing system 100.

At step 210, an event occurs in the processing system 100. At step 220, an operating system running in the processing system 100 registers the occurrence of the event. At step 230, the operating system passes the registered event to the hook chain. At step 240, the event is passed to each hook in the hook chain such that different applications, processes, and devices may be notified of the registered event. Once the event has propagated throughout the hook chain, the method 200 comprises at step 250 an application receiving notification of the event being registered by the processing system 100.

At step 260, the method 200 comprises the application initiating an API call to an API procedure so as to carry out a response to the registered event. If an API hook has been established between the API call and the API procedure, the API call is intercepted before it reaches the API procedure at step 270. Processing can be performed by an API hook function once the API call has been intercepted prior to the API procedure being called. The API call may be allowed to continue calling the API procedure at step 280.

Figure 3:
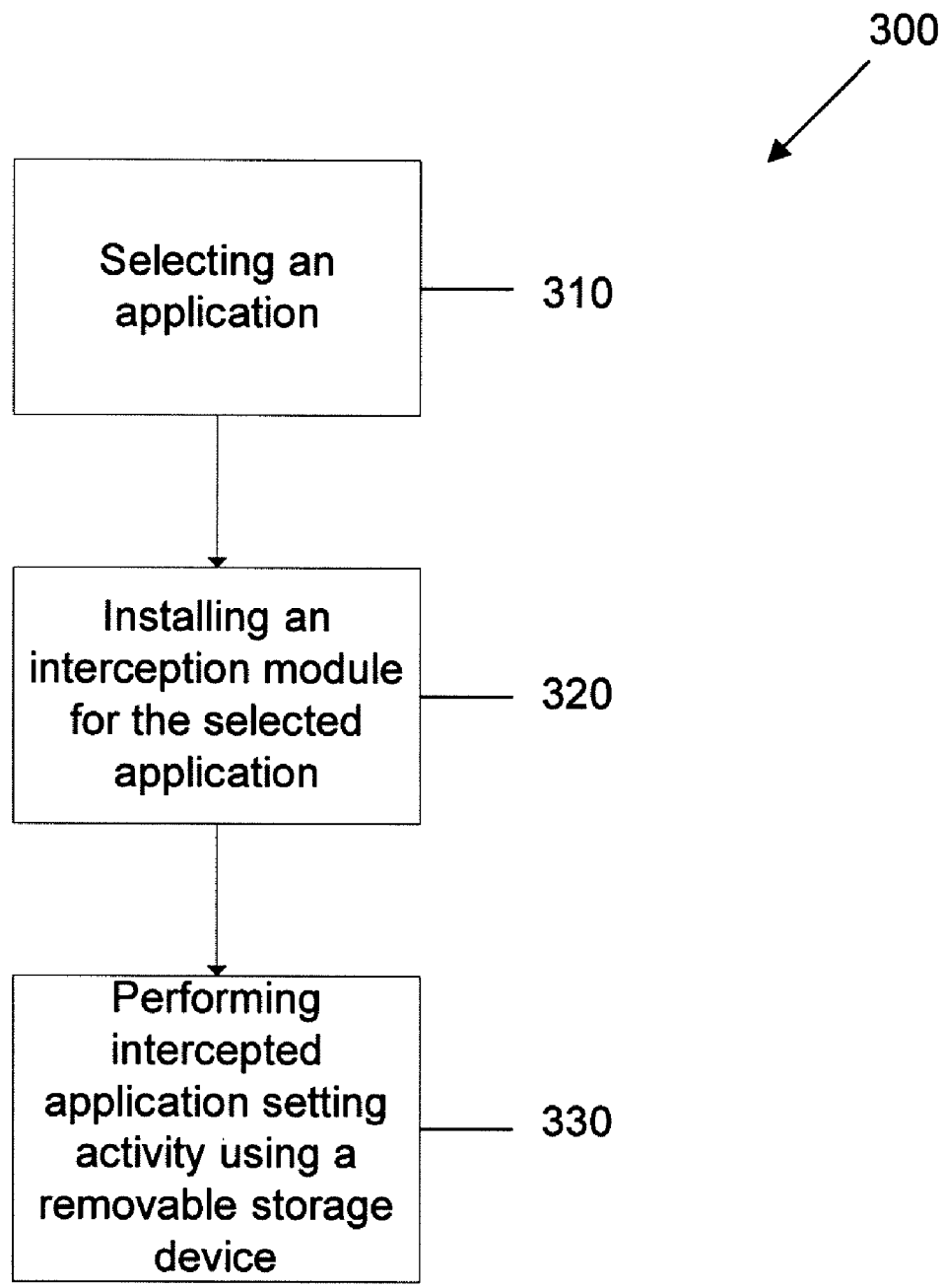
FIG. 3 is a flow diagram of an example method of performing application setting activity using a removable storage device.

Referring now to FIG. 3, there is shown a flow diagram illustrating an example method of configuring a processing system 100 to perform application setting activity 440 using a removable storage device 470 in data communication with the processing system 100.

In particular, at step 310, the method 300 comprises selecting an application 431, 432, 433, wherein setting activity 440 associated the selected application 431 is to be performed using the removable storage device 470. At step 320, the method 300 comprises installing, in the processing system 100, an interception module 450 to intercept application setting activity 440 associated with the selected application 431. In response to the interception module 450 intercepting application setting activity 440 associated with the selected application 431, step 330 comprises performing the application setting activity 440 using the removable storage device 470, thereby storing application setting data 480 associated with the selected application 431 in the removable storage device 470.

As can be appreciated, by using the interception module 450 to intercept the application setting activity 440 and performing the application setting activity 440 for the selected application 431 using the removable storage device 470, application settings data 480 specific to the selected application 431 is stored and performed using the removable storage device.

Additionally, due to the interception module 450 intercepting the application setting activity 440, source code of the selected application 431 does not have to be rewritten in order to store application setting data 480 in the removable storage device 470.

Furthermore, it can be appreciated that since the interception module 450 can automatically intercept application setting activity 440 associated with the selected application 431, the user does not need in-depth knowledge of the application 431 to copy the relevant settings data 480.

Additionally, if the processing system 100 crashes, the settings data 480 for the selected application 431 can be restored from the removable storage device 470 without the user requiring an indepth knowledge of which settings 480 cannot be copied, as the setting data 480 stored on the removable storage device 470 is relevant to the selected application 431.

Figure 4:
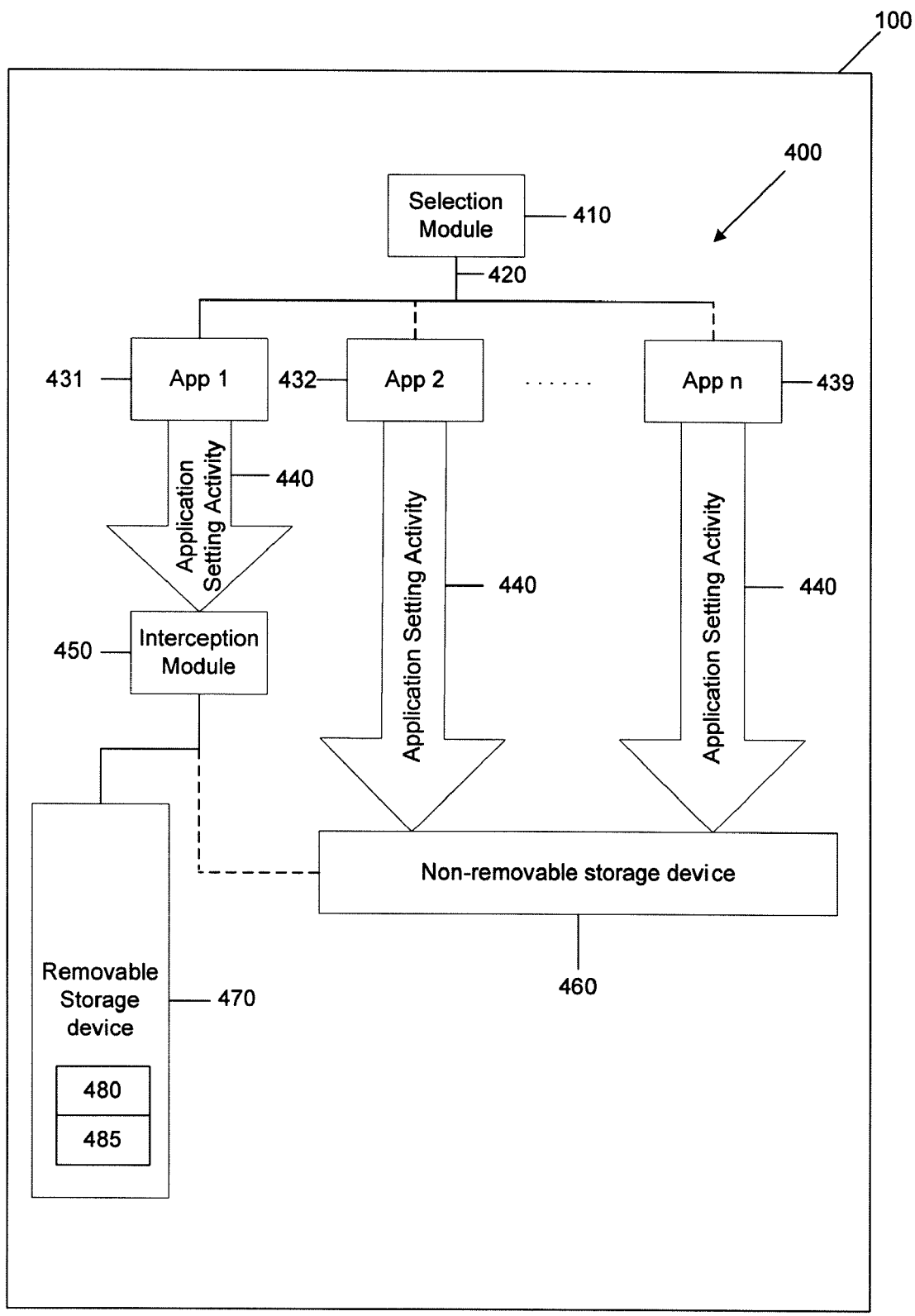
FIG. 4 is a block diagram illustrating an example system to perform application setting activity using a removable storage device.

Referring now to FIG. 4, there is shown a block diagram of an example of a system 400 to perform application setting activity 440 using a removable storage device 470 in data communication with the processing system 100.

In particular, the selection module 410 allows for one or more applications 431, 432, 439 to be selected 420, wherein application setting data 480 associated with the selected application 431 is to be stored in the removable storage device 470. When the selection 420 has been completed, the interception module 450 is installed in the processing system 100 to intercept application setting activity 440 associated with the selected application 431. In response to intercepting application setting activity 440, the application setting activity 440 is performed using the removable storage device 470. Therefore, application setting data 480 associated with the selected application 431 is stored in the removable storage device 470. Setting data for non-selected applications 432, 439 continues to be stored in the non-removable storage device 460.

Optionally, as shown by dotted lines in FIG. 4, the application setting activity 440 can be performed using the removable storage device 470 and the non-removable storage device 460. For example, if a setting value is being stored for application 431, the storage activity is intercepted and performed using the removable storage device 470 and the non-removable storage device 460. In this form, the setting data 480 stored on the removable storage device 470 is a back up copy of the settings stored in the non-removable data storage device 460 for the selected application 431.

Figure 5A:
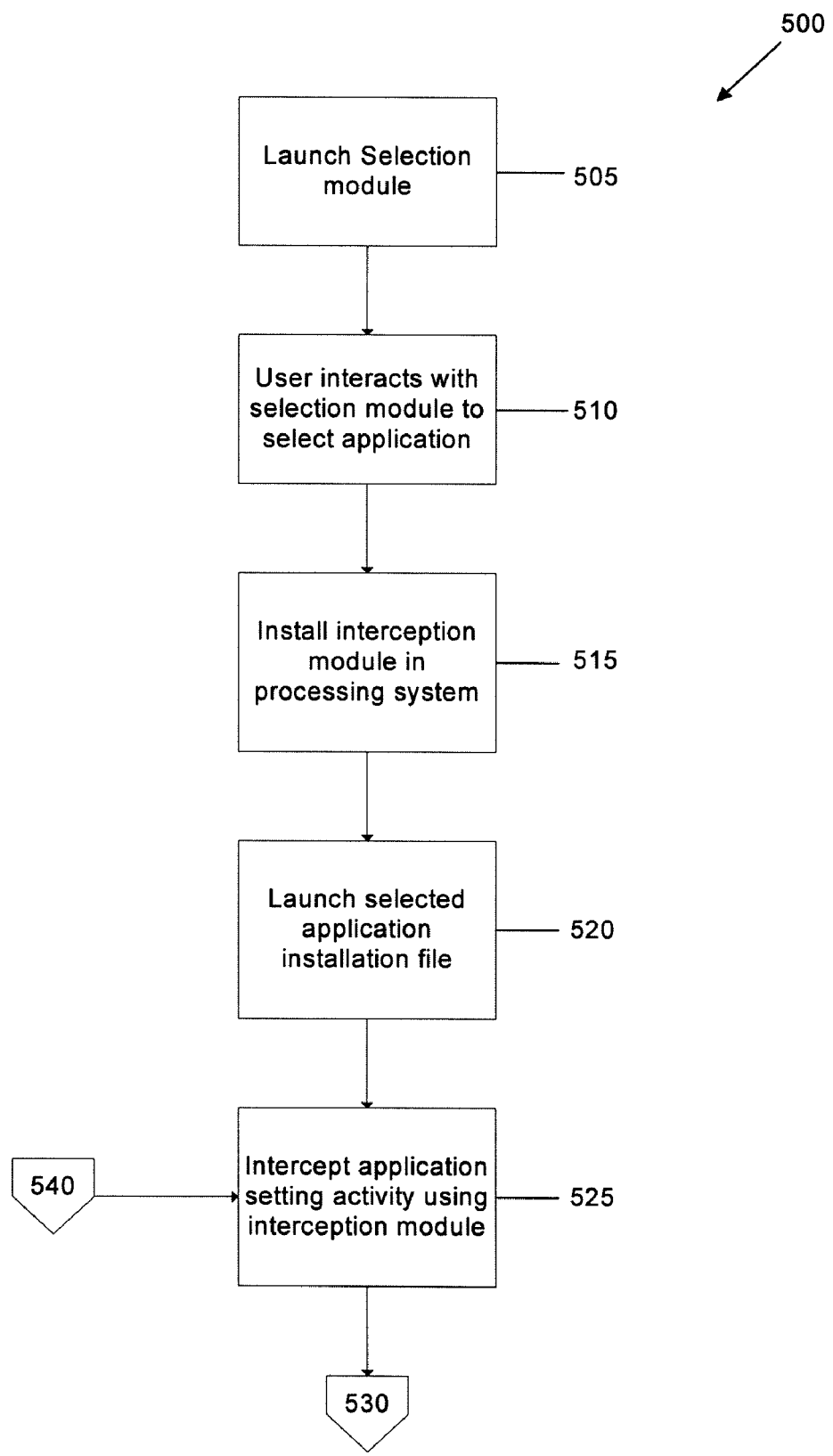
FIGS. 5A, 5B and 5C show a flow diagram illustrating a more detailed example method of performing application setting activity using a removable storage device.
Figure 5B:
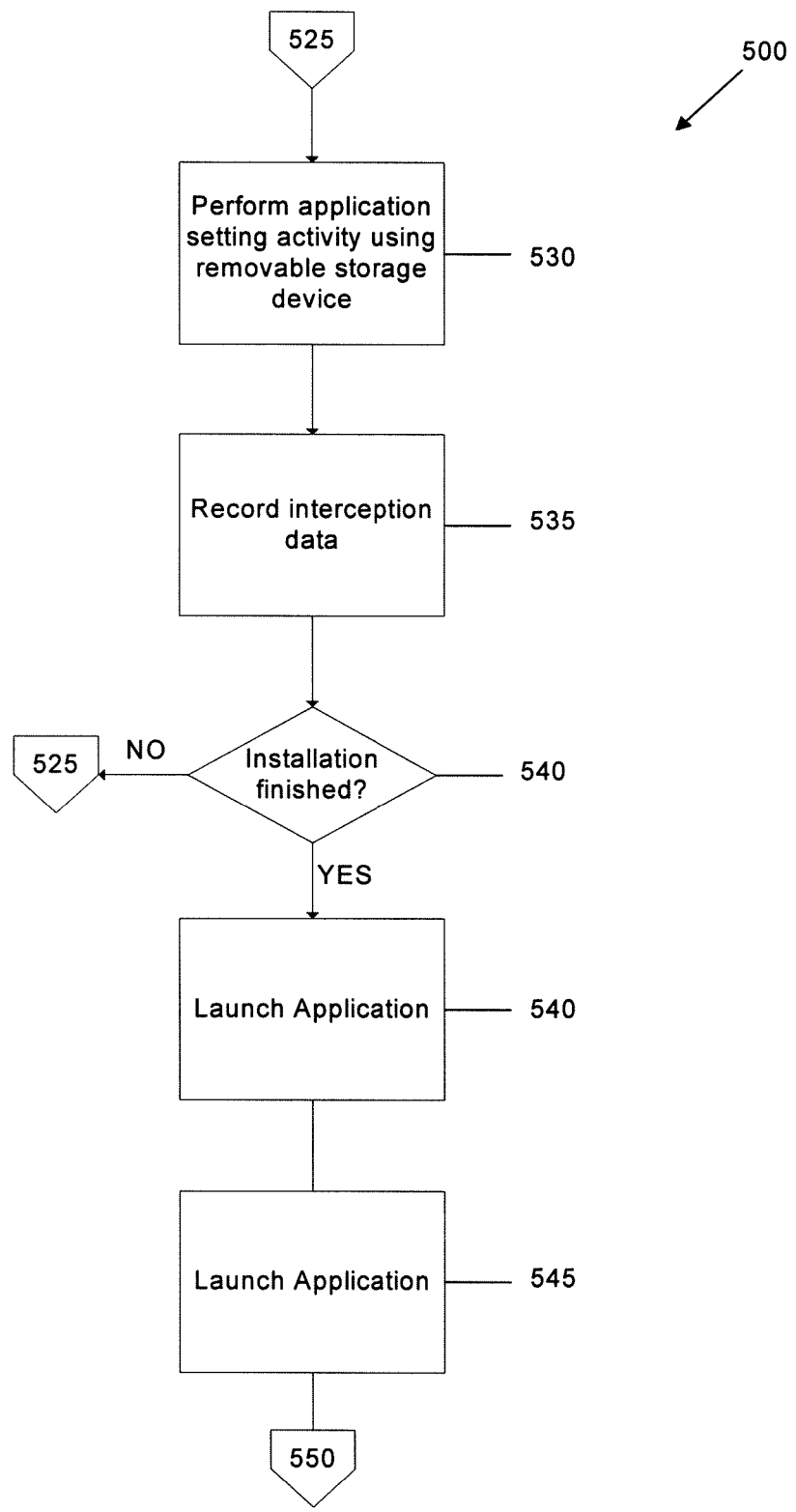
Figure 5C:
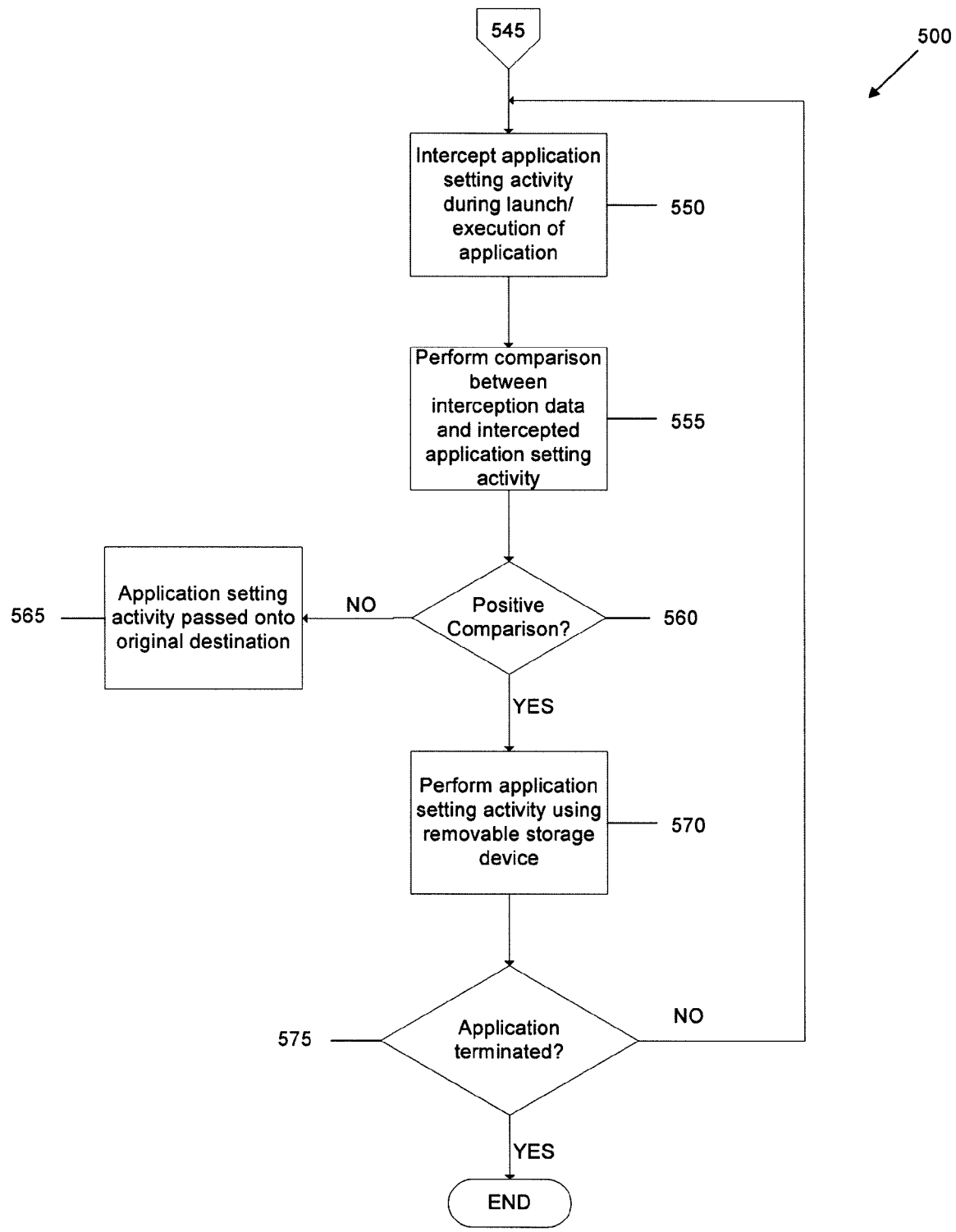

Referring now to FIGS. 5A, 5B and 5C, there is shown a more detailed flow diagram of an example method of performing application setting activity 440 using a removable storage device 470.

In particular, at step 505 the method 500 comprises launching the selection module 410. In one form, the selection module 410 is provided as a software application on the removable storage device 470 which is in data communication with the processing system 100. However, it will be appreciated that the selection module 410 could alternatively be provided in the non-removable data storage device 460 of the processing system 100.

At step 510, the user interacts with the selection module 410 to select an application 431 to install in the processing system 100. In one form, the selection module 410 is provided as a graphical user interface (GUI) which allows the user to select the application to install in the processing system 100. A pull down menu may be provided with the GUI to select the application 431 to install in the processing system 100.

At step 515, the interception module 450 is installed in the processing system 100 to intercept application setting activity 440 associated with the selected application 431 from step 520. The interception module 450 may be provided in the form of one or more hook functions which intercept application setting activity 440 for the selected application 431. It will be appreciated that the interception module can be configured to intercept activity using the technique discussed in relation to FIG. 3.

At step 520, once the interception module 450 has been installed, an installation file to install the selected application 431 is launched so as to begin installing the application 431 in the memory of the processing system 100.

Alternatively, the installation of the application 431 may redirected to be installed in the removable storage device 470, such that the application 431 is portable between processing systems, and thus does not require installation in the processing system memory. The installation may be at least partially installed in the removable storage device, or wholly installed in the removable storage device. The interception module 450 can be configured to intercept application installation activity. During the installation, the interception module may intercept application installation activity associated with installing the application 431 in the processing system and perform the application installation activity using the removable storage device 470. Thus, the application 431 is installed in the removable storage device 470. Optionally, the application 431 may be installed in both the processing system and the removable storage device 470.

At step 525, during the installation of the application 431, application setting activity 440 associated with the selected application 431 is intercepted by the interception module 450. Generally, whilst an application is installing, a number of default settings are installed, such as the setting entries in the system registry of the processing system 100. This form application setting activity 440 is intercepted by the interception module 450.

At step 530, the method 500 comprises performing the application setting activity 450 using the removable storage device 470. The application setting activity 440 can comprise a read activity, a create activity, and/or a write activity.

The removable storage device 470 can comprise a database to emulate a system registry to allow data to be created, stored and read using the removable storage device 470. The database can be configured to emulate common configuration file formats, comprising INI files, INF files, and Windows registry entries.

It will be appreciated that other forms of settings activity 440 associated with the application 431 can be intercepted during the installation process of the application 431. In an optional form, non-system installed processes loaded by the launched installation file can be intercepted, such that the setting activity 440 can be performed using the removable storage device 470.

At step 535, details of the intercepted setting activity 440 performed using the removable storage device are stored in the removable storage device 470. These details are herein referred to as interception data 485. The interception data 485 can be indicative of the type of setting data 480, the original location which the setting data 480 was to be stored, created and/or read, and the new location in the removable storage device 470 of the setting data 480.

Steps 525 to 535 continue to be performed until the installation of the application 431 has completed, as depicted by the decision block of step 540 in FIG. 5.

Once the application 431 has been installed, the user may launch the application 431 at step 545. During the launch and execution of the application 431, application setting activity 440 is generally initiated by the application 431 to retrieve, create and/or store setting data 480. At step 550, the method comprises the interception module 450 intercepting the application setting activity 440 during the launch and execution of the application 431. Step 550 is performed similarly to step 525.

At step 555, the interception data 485 may be compared to the intercepted request to determine if setting data has been stored in the removable storage device. If the comparison results in a positive comparison, as determined at step 560, the method 500 proceeds to step 570 to perform the application setting activity using the removable storage device. If the comparison results in a negative comparison, the method 500 proceeds to step 565 where the interception module 450 passes the application setting activity 440 to the intended destination, as previously discussed in relation to FIG. 3. It will be appreciated that if the intercepted request is to create a setting, a comparison to the removable storage device 470 may not be required.

At step 570, the method 500 comprises performing the application setting activity 440 using the removable storage device 470. For example, if the application 431 initiates a request to retrieve a setting associated with whether a wizard should be opened upon launching the application 431, the interception data 485 is used to determine where the application setting data 480 is stored in the database. Once the location in the database is determined, the application setting data 480 is retrieved from the removable storage device 470 and returned to the application 431.

Steps 550 to 570 are repeated until the application 431 is terminated, as represented by step 575. During termination of the application, further application setting activity 440 may be intercepted and performed using the removable storage device 470.

Figure 6A:
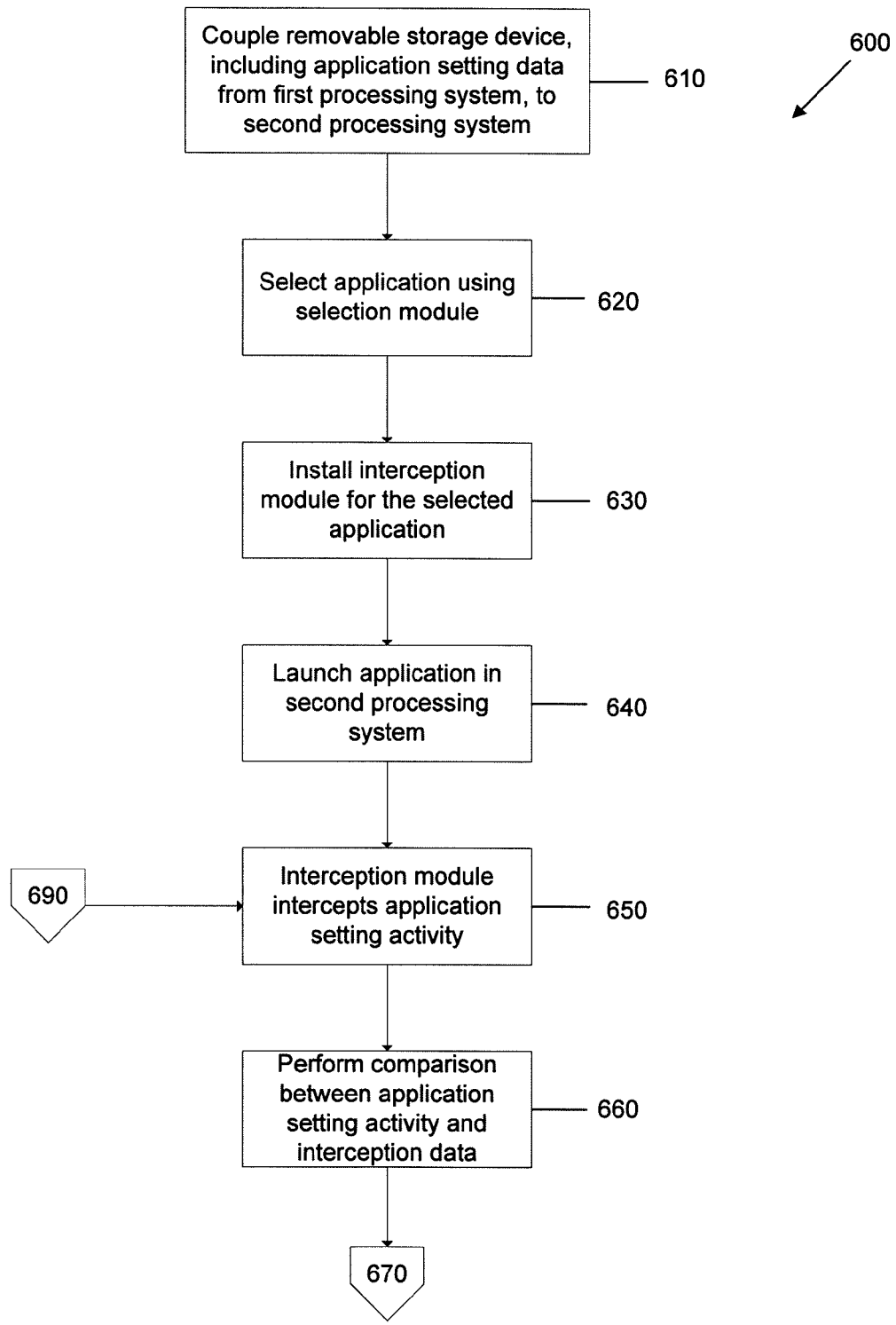
FIGS. 6A and 6B show a flow diagram illustrating an example method of maintaining application settings between processing systems using a removable storage device.
Figure 6B:
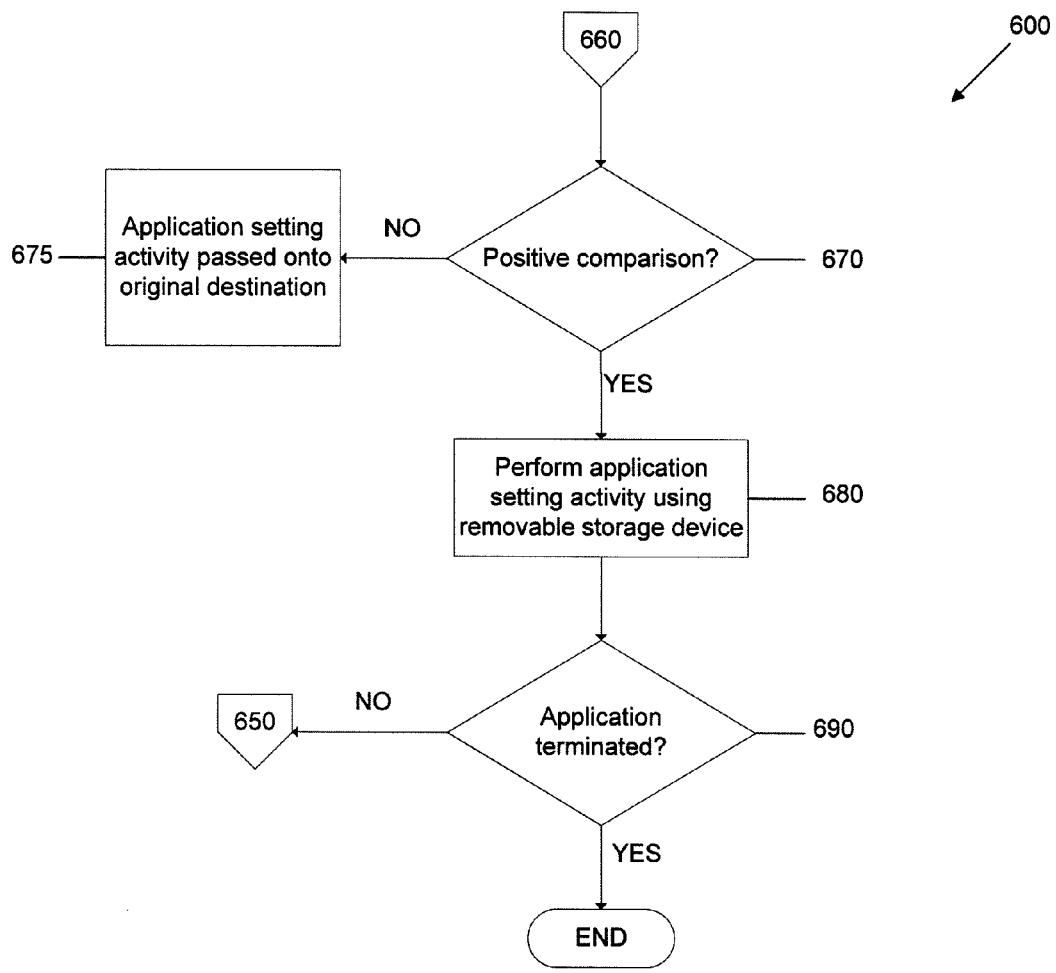

Referring now to FIGS. 6A and 6B, there is shown a method of transferring application settings between processing systems. The method 600 is directed towards allowing a roaming application profile, in that application settings stored on the removable storage device for a first processing system 100 can be used and maintained for the same application at a second processing system 190 (not shown). It will be appreciated that the second processing system is a form of processing system 100.

In particular, at step 610, the method 600 comprises coupling the removable storage device 470 with the second processing system 190. The removable storage device 470 comprises application setting data 480 associated with an application 431 in a first processing system 100. In an optional form, the removable storage device 470 may also comprise the installed application.

At step 620, the method 600 comprises selecting the application 431 which application setting data 480 from the first processing system 100 is to be maintained. In particular, the selection module 410 in the form of a graphical user interface may be used to select the application 431.

At step 630, the method 600 comprises installing the interception module 450 for the selected application 431 in the second processing system 190. At step 640, the application is launched in the second processing system 190. The application 431 may be launched from memory of the second processing system or from the removable storage device 470 depending on where the application has been installed.

At step 650, the method 600 comprises intercepting application setting activity 440 associated with the selected application 431. At step 660, the method 600 comprises performing a comparison between the intercepted setting activity 440 and the interception data 485. In response to a positive comparison, as determined at step 670, the method 600 proceeds to step 680. In response to a negative comparison, the method 600 proceeds to step 675 where the intercepted setting activity 440 is passed to the appropriate destination, as discussed in relation to FIG. 3.

At step 680, the method 600 comprises the intercepted setting activity 440 being performed using the removable storage device 470. This can comprise determining, using the interception data 485, the location of the application setting data 480 in the removable storage device 470, and performing the application setting activity using the removable storage device 470. For example, an intercepted read activity results in the appropriate application setting data 480 being retrieved from the database of the removable storage device 470. In another example, an intercepted write activity results in the old application setting data 480 being overwritten in the database of the removable storage device 470.

At step 490, the method comprises determining if the application 431 has terminated. If the application 431 has terminated, the method 600 ends. If the application 431 has not terminated, the method 600 returns back to step 450 to intercept application setting activity 440 for the selected application 431 in the second processing system 190.

The method of 600 allows for application setting data for one or more selected applications 431 to be maintained between a first and second processing system 100, 190. Therefore, the user is not required to reset application settings for an application at the second processing system 190.

In an optional form, the processing system comprises one or more rules which, when applied, determine whether intercepted application setting activity is to be performed using the memory of the processing system or the removable storage device. In particular, the one or more rules are applied once application setting activity is intercepted. The one or more rules may be part of, or called by, the respective intercepting hook function. The one or more rules may be installed in the memory of the processing system by the installation module.

In another alternative, the one or more rules may be installed in the removable storage device rather than the memory of the processing system, thereby allowing the one or more rules to be portable between processing systems. In this embodiment, the one or more rules may be used from the removable storage device or alternatively, the one or more rules may be copied to the processing system memory and then used from the memory of the processing system. When the removable storage device is coupled to the processing system, the one or more rules are copied onto the memory of the processing system. When the removable storage device is uncoupled from the processing system, a clean-up process may be performed in order to delete the one or more rules from the memory of the processing system.

In one form, the one or more rules may be dynamically generated during installation of the application. This can comprise the use of a rule generation module which monitors the installation by the installation module of the application and generates one or more rules which can be applied to determine whether the removable storage device and/or the processing system is to be used for performing the application setting activity. In an additional or alternate form, an analyst may monitor the execution of the application after installation of the application and manually generate the one or more rules.

The application of the one or more rules can be used to ignore performing application setting activity such as writing temporary files and the like at non-standard temporary locations in the memory of the processing system. Furthermore, the application of the one or more rules also filter the storage or entities which are unable to be stored only on the removable storage device such as kernel mode drivers and system service, thereby allowing these types of application setting activity to be performed using the memory of the processing system.

It will also be appreciated that the binary code of the application 431 does not need to be altered in order for the setting activity to be stored on the removable storage device due to the interception module 450 intercepting setting activity to be performed using the removable storage device. This therefore alleviates custom code for the application 431 being written in order to redirect the application setting activity to the removable storage device 470.

Furthermore, it will also be appreciated that installing the application 431 in the removable storage device 470 also provides significant benefits such as a reduction in memory usage in processing systems as only the interception module 450 is required to be installed in each processing system rather than the application 431.

It will be appreciated that the application setting activity can subsequently be performed in relation to non-removable storage device 460 of the second processing system 190.

It will be appreciated that any form of removable storage device can be used, such as a floppy disk, rewrittable compact disks, Universal Serial Bus (USB) keys, and the like.

An example piece of pseudocode for performing application setting activity using a removable storage device is provided below.

```
Procedure initialize
Begin
    CALL initialize_settings_database( );
    CALL intercept_relevant_system_APIs( );
    CALL execute_setup_program( );
    IF a call to intercepted system APIs THEN
        execute interceptEvent PROCEDURE
End;
Function interceptEvent ( event )
Begin
    If event.Type == FILE_SYSTEM Then Begin
        Redirection =
create_redirect_object(removable_storage_location( ),
event);
        Call record_event(event, redirection);
        Result = Call file_system_api(Redirection);
        EXIT function;
    End;
    If event.Type == CONFIGURATION_SETTING Then Begin
        Call record_event(event, NULL);
        Result = Call config_layer_api(event); // described
in step 7
        EXIT function;
    End;
    Result = Call actual_api( event );
End;
```

An example piece of pseudocode for maintaining application settings from a first processing system to a second processing system using a removable storage device is provided below.

```
Procedure initialize
Begin
    CALL initialize_settings_database( );
        redir_db = CALL
load_redirection_database(selected_program);
    CALL intercept_relevant_system_APIs( );
    CALL execute(selected_program);
    IF a call to intercepted system APIs THEN
        execute interceptEvent PROCEDURE
End;
Function interceptEvent ( event )
Begin
    If event.Type == FILE_SYSTEM Then Begin
        if isMatch ( event, redir_db ) Then Begin
            Redirection =
get_redirect_object(removable_storage_location( ),
event);
            Result = Call file_system_api(Redirection);
            EXIT function;
        End;
    End;
    If event.Type == CONFIGURATION_SETTING Then Begin
        if isMatch ( event, redir_db ) Then Begin
            Result = Call config_layer_api(event); //
described in step 3
            EXIT function;
        End;
    End;
    Result = Call actual_api( event );
End;
```

The embodiments illustrated may be implemented as a software package or component. Various embodiments can be implemented for use with the Microsoft Windows operating system or any other modern operating system. The embodiments described throughout can also be implemented via hardware, or a combination of hardware and software.

In an optional form, prior to installing the interception module 450 in a processing system 100, a search of the processing system memory may be conducted to determine if an interception module 450 for the selected application has already previously been installed. If the interception module 450 has previously been installed in the processing system 100, the installation step of the interception module does not need to be performed.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the invention are as follows:

1. A method to configure a processing system to perform application setting activity using a removable storage device in data communication with the processing system, wherein the method comprises:
    selecting a plurality of applications, wherein the application setting activity associated with the plurality of selected applications is to be performed using the removable storage device or the processing system;
    installing, in the processing system, a plurality of interception modules to intercept the application setting activity associated with the plurality of selected applications;
    upon intercepting respective application setting activity associated with a respective selected application of the plurality of selected applications, applying one or more rules to determine whether the respective application setting activity is to be performed using the processing system or the removable storage device;
    in response to each of the interception modules intercepting respective application setting activity associated with respective selected applications of the plurality of selected applications, performing the respective application setting activity using the processing system or the removable storage device; and
    storing, in the removable storage device, respective application setting data indicative of the respective application setting activity associated with the respective selected application of the plurality of selected applications.

2. The method according to claim 1, wherein the method comprises performing the application setting activity using the removable storage device and a non-removable storage device of the processing system.

3. The method according to claim 2, wherein when the application setting activity is intercepted, the method comprises the removable storage device copying application setting data stored to the non-removable data storage device for the plurality of selected applications.

4. The method according to claim 1, wherein the method comprises launching a selection module to select the plurality of applications, wherein the selection module is launched from one of:
the processing system; and
the removable storage device.

5. The method according to claim 1, wherein the plurality of interception modules comprise one or more hook functions, wherein the method comprises, intercepting, using the one or more hook functions of the plurality of interception modules, the application setting activity associated with the plurality of applications.

6. The method according to claim 1, wherein the method comprises installing the plurality of interception modules followed by launching and installing the plurality of applications in the processing system.

7. The method according to claim 1, wherein the removable storage device comprises a database, wherein the method comprises, in response to intercepting the application setting activity, using the database to emulate a system registry.

8. The method according to claim 7, wherein the method comprises storing interception data in the removable storage device, wherein the interception data is indicative of:
a type of application setting data which was intercepted;
an original location of the application setting data; and
a new location in the removable storage device of the application setting data.

9. The method according to claim 8, wherein in response to intercepting the application setting activity, the method comprises querying the interception data to determine if the application setting data associated with the application setting activity is stored on the removable storage device, wherein in response to a positive query, the application setting data is used to perform the application setting activity.

10. The method according to claim 1, wherein the method comprises:
uncoupling removable setting data from the processing system;
coupling the removable setting data with a second processing system, wherein the second processing system comprises the selected plurality of applications, wherein use of the selected plurality of applications results in the application setting activity being intercepted such that the application setting data stored on the removable storage device is used.

11. The method according to claim 1, wherein the method comprises:
installing, in at least one of the removable storage device and the processing system, the one or more rules.

12. A system to configure a processing system to perform application setting activity using a removable storage device in data communication with the processing system, wherein the system is configured to:
select a plurality of applications, wherein the application setting activity associated with the plurality of selected applications is to be performed using the removable storage device or the processing system;
install, in the processing system, a plurality of interception modules to intercept the application setting activity associated with the plurality of selected applications;
upon intercepting respective application setting activity associated with a respective selected application of the plurality of selected applications, apply one or more rules to determine whether the respective application setting activity is to be performed using the processing system or the removable storage device;
in response to each of the interception modules intercepting respective application setting activity associated with respective selected applications of the plurality of selected applications, perform the respective application setting activity using the processing system or the removable storage device; and
store, in the removable storage device, respective application setting data indicative of the respective application setting activity associated with the respective selected application of the plurality of selected applications.

13. The system according to claim 12, wherein the system is configured to perform the application setting activity using the removable storage device and a non-removable storage device of the processing system.

14. The system according to claim 12, wherein the system is configured to launch a selection module to select the plurality of applications, wherein the selection module is launched from one of:
the processing system; and
the removable storage device.

15. The system according to claim 12, wherein the removable storage device comprises a database configured to emulate a system registry.

16. The system according to claim 15, wherein the system is configured to store interception data in the removable storage device, wherein the interception data is indicative of:
a type of application setting data which was intercepted;
an original location of the application setting data; and
a new location in the removable storage device of the application setting data.

17. The system according to claim 16, wherein in response to intercepting the application setting activity, the system is configured to query the interception data to determine if the application setting data associated with the application setting activity is stored on the removable storage device, wherein in response to a positive query, the application setting data is used to perform the application setting activity.

18. A computer program product for performing application setting activity using a removable storage device in data communication with a processing system, wherein the computer program product comprises a non-transitory computer readable medium having a computer program recorded therein or thereon, wherein the computer program product configures the processing system to:
select a plurality of applications, wherein the application setting activity associated with the plurality of selected applications is to be performed using the removable storage device or the processing system;
install, in the processing system, a plurality of interception modules to intercept the application setting activity associated with the plurality of selected applications;
upon intercepting respective application setting activity associated with a respective selected application of the plurality of selected applications, apply one or more rules to determine whether the respective application setting activity is to be performed using the processing system or the removable storage device;
in response to each of the interception modules intercepting respective application setting activity associated with respective selected applications of the plurality of selected applications, perform the respective application setting activity using the processing system or the removable storage device; and
store, in the removable storage device, respective application setting data indicative of the respective application setting activity associated with the respective selected application of the plurality of selected applications.

* * * * *